United States Patent
Kaburagi et al.

(10) Patent No.: US 8,431,847 B2
(45) Date of Patent: Apr. 30, 2013

(54) TURNING DIRECTION INDICATOR DEVICE

(75) Inventors: Daiki Kaburagi, Fukui (JP); Masahiko Fujita, Fukui (JP); Noriko Hasegawa, Fukui (JP); Takeo Nakamura, Fukui (JP); Manabu Shiroshita, Aichi (JP)

(73) Assignee: Panasonic Corporation, Osaka (JP)

(*) Notice: Subject to any disclaimer, the term of this patent is extended or adjusted under 35 U.S.C. 154(b) by 295 days.

(21) Appl. No.: 12/950,165

(22) Filed: Nov. 19, 2010

(65) Prior Publication Data

US 2011/0127148 A1 Jun. 2, 2011

(30) Foreign Application Priority Data

Nov. 30, 2009 (JP) ................. 2009-271380

(51) Int. Cl.
*H01H 3/18* (2006.01)
(52) U.S. Cl.
USPC ...................... 200/61.27; 200/61.3
(58) Field of Classification Search ........... 200/17 R, 200/18, 61.27, 61.3, 61.32, 61.35, 61.36, 200/61.38, 61.39, 61.54, 332, 335
See application file for complete search history.

(56) References Cited

U.S. PATENT DOCUMENTS

| 5,672,855 | A * | 9/1997 | Uchiyama et al. | 200/61.3 |
| 6,069,329 | A * | 5/2000 | Weiss et al. | 200/61.3 |
| 6,172,311 | B1 * | 1/2001 | Hayashi | 200/61.27 |
| 6,515,243 | B2 * | 2/2003 | Ito | 200/61.3 |
| 6,953,902 | B2 * | 10/2005 | Naito | 200/61.3 |
| 7,541,550 | B2 * | 6/2009 | Kosaka | 200/61.27 |
| 2005/0284743 | A1 * | 12/2005 | Takiguchi et al. | 200/341 |
| 2008/0121500 | A1 * | 5/2008 | Matsumura et al. | 200/61.54 |
| 2009/0095609 | A1 * | 4/2009 | Ruff | 200/329 |

FOREIGN PATENT DOCUMENTS

| CN | 201891727 U | * | 7/2011 |
| JP | 08-167345 | | 6/1996 |

* cited by examiner

*Primary Examiner* — Michael Friedhofer
(74) *Attorney, Agent, or Firm* — McDermott Will & Emery LLP

(57) ABSTRACT

A turning direction indicator device includes an actuator that rotates by an operation of an operating lever so as to be positioned at neutral and operational positions, a cover that has a lower surface having a guide groove therein extending in a rearward direction toward the cancel cam, a cam body that has an upper surface sliding with respect to the lower surface of the cover, an urging spring that urges the cam body in the rearward direction, a release element that rotates together with the actuator, and a grease provided between the upper surface of the cam body and the lower surface of the cover. The cam body includes ridges projecting from the upper surface of the cam body. The turning direction indicator device suppresses a hitting noise produced by the cam body and the release element with such a simple structure, and operates reliably.

15 Claims, 16 Drawing Sheets

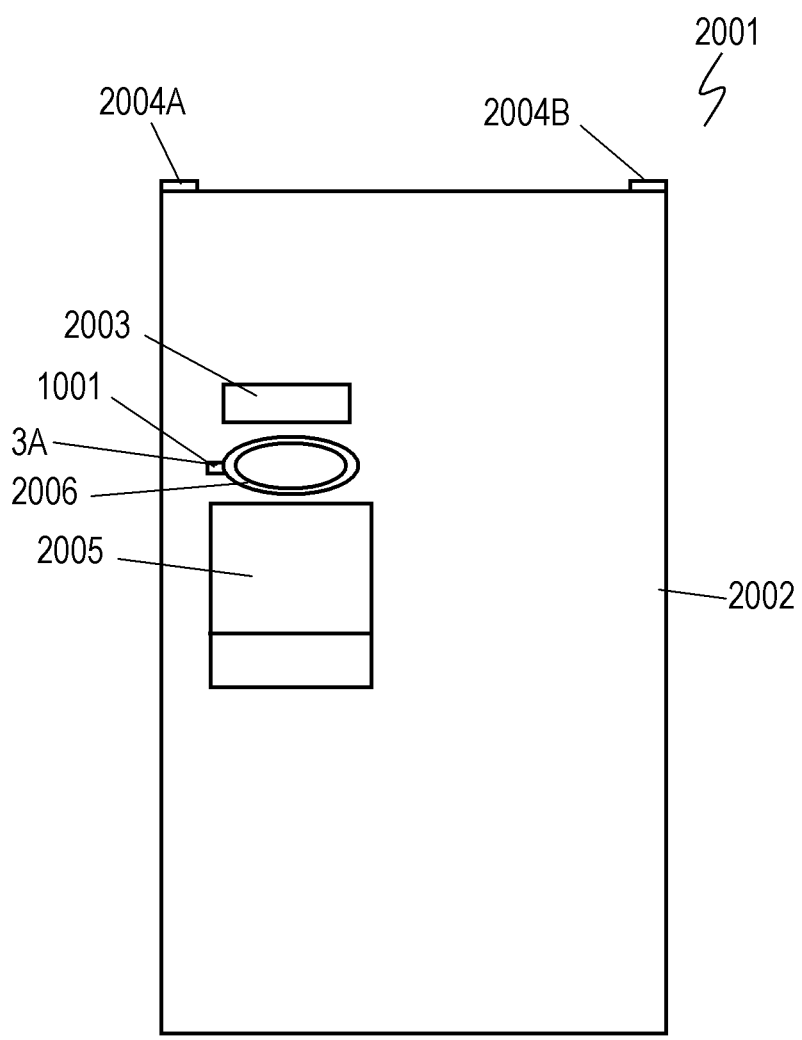

TURNING DIRECTION INDICATOR DEVICE

FIELD OF THE INVENTION

The present invention relates to a turning direction indicator device that is often installed near a steering wheel of an automobile to flash on and off turn-signal lamps according to an operation of an operating lever.

BACKGROUND OF THE INVENTION

In recent years, a turning direction indicator device that flashes on and off turn-signal lamps according to an operation of an operating lever installed in an automobile is demanded to produce a low noise. A large operation noise may be produced in the case that a driver rotates the operating lever in a turning direction and retains it in a position for indicating the turning direction, or the case that the operating lever is automatically returned to a neutral position in accordance with a rotating operation of the steering wheel.

FIGS. 9 and 10 are a partial cutaway view and an exploded perspective view of conventional turning direction indicator device 501, respectively. Turning direction indicator device 501 includes actuator 1 and cover 2 for accommodating actuator 1. Shaft part 1A provided on an upper surface of actuator 1 is pivotally supported by bearing part 2A at a front side lower surface of cover 2, such that actuator 1 is rotatable in rightward and leftward directions.

At a tip of operating lever 3, substantially cylindrical operating part 3A is provided. At a root of operating lever 3, driver part 3B that extends from operating part 3A toward actuator 1 is provided.

Shaft part 3C provided at each side of driver part 3B is pivotally supported by shaft hole 1B provided in a front part of actuator 1, whereby operating lever 3 is attached to actuator 1 so as to be rotatable in upward and downward directions.

Cam body 5 is placed on an upper surface of actuator 1. Cam body 5 includes base part 5A having a substantially elongated circular shape, upper shaft part 5B provided on an upper surface of base part 5A, lower shaft part 5C provided on a lower surface of base part 5A, front cam part 5D projecting from a front part of base part 5A, and rear cam part 5E projecting from a rear part of base part 5A. The upper surface of base part 5A has a flat shape. Lower shaft part 5C extends coaxially with upper shaft part 5B.

Guide groove 2B is provided in a lower surface of cover 2. Guide groove 2B has an elongated hole shape extending in frontward and rearward directions, and is concave upward. Upper shaft part 5B engages with guide groove 2B, whereby cam body 5 is retained with cover 2 so as to be capable of shifting in the frontward and rearward directions and rotating.

Grease is applied between an upper surface of cam body 5 and the lower surface of cover 2, to reduce the sliding friction between the lower surface of cover 2 and the upper surface of cam body 5. Further, resistance due to, e.g. viscosity of the grease suppresses a rapid movement of cam body 5.

Both ends of urging spring 6, a coil spring, are engaged at predetermined positions on the lower surface of cover 2. Engaging recess 5F is provided in the lower surface of cam body 5. The substantially center part of urging spring 6 engages with engaging recess 5F of cam body 5, to urge cam body 5 in the rearward direction.

Release element 7 has release projecting parts 7A that project from opposite ends of release element 7 in the rearward direction, to form a substantially squared C-shape. Release element 7 is retained substantially at the middle of the upper surface of actuator 1.

Hole 1F provided in a rear end part of actuator 1 accommodates click spring 9A together with click pin 9B therein while click spring 9A is compressed. Click pin 9B faces click cam 2D of cover 2. Click pin 9B elastically contacts click cam 2D. Click spring 9A and click pin 9B constitute retainer unit 9 that retains actuator 1 at the neutral position of operating lever 3. When operating lever 3 rotates in rightward and leftward directions, retainer unit 9 operates while giving a click feel, and retains actuator 1 at predetermined positions in the rightward and leftward directions.

Case 10 opens upward. Case 10 pivotally supports actuator 1 such that actuator 1 is rotatable about shaft part 1A. Further, case 10 covers an opening of cover 2 that opens downward, to accommodate actuator 1 having operating lever 3 attached thereto.

Wiring patterns are formed on upper and lower surfaces of wiring board 11 made of an insulating resin. An upper end of slider 12 engages with driver recess 1G of actuator 1. A fixed contact is disposed at a predetermined place on wiring board 11. Switch contact part 12A is structured, in which movable contact 12B fixed to the lower surface of slider 12 slides on the fixed contact while elastically contacting thereto to perform electrical connection and disconnection between movable contact 12B and the fixed contact.

Rotation of actuator 1 associated with a rightward or leftward rotary operation of operating lever 3 causes electrical connection and disconnection of switch contact part 12A. Bottom plate 13 covers the lower surface of wiring board 11, to structure turning direction indicator device 501.

FIGS. 11A and 11B are top schematic views of turning direction indicator device 501 for illustrating an operation of turning direction indicator device 501. Turning direction indicator device 501 is installed below the steering wheel located in front of a driver's seat in an automobile, such that operating part 3A projects outward. As shown in FIG. 11A, substantially arcuate cancel cams 20 rotate in accordance with the rotation of the steering shaft. Cancel cams 20 are disposed near the rear side of actuator 1. Rear cam part 5E of cam body 5 projects outward from opening 2C (see FIG. 10) of cover 2. A lead wire for external connection is connected to connector part 11A of wiring board 11, and connects switch contact part 12A electrically to an electronic circuit of the automobile. Retainer cam 1E has a substantially triangular shape having an apex and opposite end parts.

As shown in FIG. 11A, when operating lever 3 is retained at the neutral position, cam body 5 is urged by urging spring 6 in the rearward direction, which is directed toward cancel cam 20. Here, lower shaft part 5C elastically contacts the apex of retainer cam 1E, and rear cam part 5E is at a non-abutting position which is outwardly away from a rotary orbit of cancel cams 20. Here, front cam part 5D is at substantially the intermediate position between release projecting parts 7A positioned at the opposite ends of release element 7.

When the driver rotates operating lever 3 in the rightward direction upon turning the automobile rightward, as shown in FIG. 11B, operating lever 3 rotates with actuator 1 about shaft part 1A of actuator 1. Actuator 1 is retained by retainer unit 9 (see FIG. 10) at a first operational position where actuator 1 has rotated rightward by a predetermined angle. Here, lower shaft part 5C of cam body 5 slides on an angled edge of retainer cam 1E from the apex while maintaining elastic contact, to approach one of the opposite end parts of retainer cam 1E.

Similarly, when operating lever 3 is rotated in the leftward direction, actuator 1 is retained by retainer unit 9 (see FIG. 10) at a second operational position where actuator 1 has rotated in the leftward direction by a predetermined angle. Here, lower shaft part 5C of cam body 5 slides on the angled edge of retainer cam 1E from the apex while maintaining elastic contact, to approach the other one of the opposite end parts of retainer cam 1E.

When actuator 1 is retained at the first operational position, rear cam part 5E of cam body 5 recedes to be positioned on the rotary orbit of cancel cams 20, i.e., an abuttable position, and a tip of front cam part 5D abuts on an inner side surface of release projecting part 7A.

In accordance with the rotation of actuator 1, switch contact part 12A performs electrical connection and disconnection to produce an electric signal, based on which the electronic circuit of the automobile flashes on and off a right turn-signal lamp of the automobile.

Next, when the driver rotates the steering wheel clockwise in the rightward direction for turning the automobile rightward, cancel cams 20 as the steering wheel rotate clockwise. The clockwise rotation of cancel cams 20 causes cancel cam 20 to abut on rear cam part 5E of cam body 5. Then, cam body 5 rotates counterclockwise about upper shaft part 5B. Here, front cam part 5D is removed away from release projecting part 7A, while enhancing the clockwise urging force attributed to bending of urging spring 6 engaged with engaging recess 5F.

Further, as this clockwise rotary operation of the steering wheel further proceeds, rear cam part 5E is removed from cancel cam 20. Thus, clockwise rotation of cam body 5 caused by cancel cam 20 is released. Here, cam body 5 is urged by urging spring 6 so as to rotate clockwise, and front cam part 5D hits the inner side surface of release projecting part 7A positioned on the right side of release element 7.

Grease is applied between the upper surface of cam body 5 and the lower surface of cover 2. The upper surface of base part 5A of cam body 5 slides on the lower surface of cover 2. When used for a long period under various environments in terms of changes in temperature, humidity and the like, the grease between the upper surface of base part 5A of cam body 5 and the lower surface of cover 2 is expelled from the sliding range toward the outside. This reduces the resistance due to the grease exerted over the operation of cam body 5 and causes front cam part 5D to hit release projecting part 7A with a relatively large impact force, which is prone to result in a large hitting noise.

When the driver finishes turning the automobile and is to return the steering wheel to an original neutral position, the steering wheel is rotated in the opposite direction, i.e., the counterclockwise direction. This rotation of the steering wheel in the counterclockwise direction allows cancel cams 20 in the state shown in FIG. 11B to rotate in the counterclockwise direction, whereby cancel cam 20 pushes rear cam part 5E. Thus, cam body 5 rotates in the clockwise direction about upper shaft part 5B. Here, the right end of front cam part 5D rotates actuator 1 in the counterclockwise direction. Thus, as shown in FIG. 11A, the neutral state is recovered in which actuator 1 and operating lever 3 return to the neutral position and retained there, and the turn-signal lamp having been flashing on and off is turned off.

A turning direction indicator device similar to conventional turning direction indicator device 501 is disclosed in Japanese Patent Laid-Open Publication No. 08-167345.

SUMMARY OF THE INVENTION

A turning direction indicator device includes an actuator that rotates by an operation of an operating lever so as to be positioned at neutral and operational positions, a cover that has a lower surface having a guide groove therein extending in a rearward direction toward the cancel cam, a cam body that has an upper surface sliding with respect to the lower surface of the cover, an urging spring that urges the cam body in the rearward direction, a release element that rotates together with the actuator, and a grease provided between the upper surface of the cam body and the lower surface of the cover. The cam body includes ridges projecting from the upper surface of the cam body.

The turning direction indicator device suppresses a hitting noise produced by the cam body and the release element with such a simple structure, and operates reliably.

BRIEF DESCRIPTION OF DRAWINGS

FIG. 4C is a top schematic view of an automobile having the turning direction indicator device according to the embodiment installed therein.

DETAILED DESCRIPTION OF PREFERRED EMBODIMENT

Figure 1:
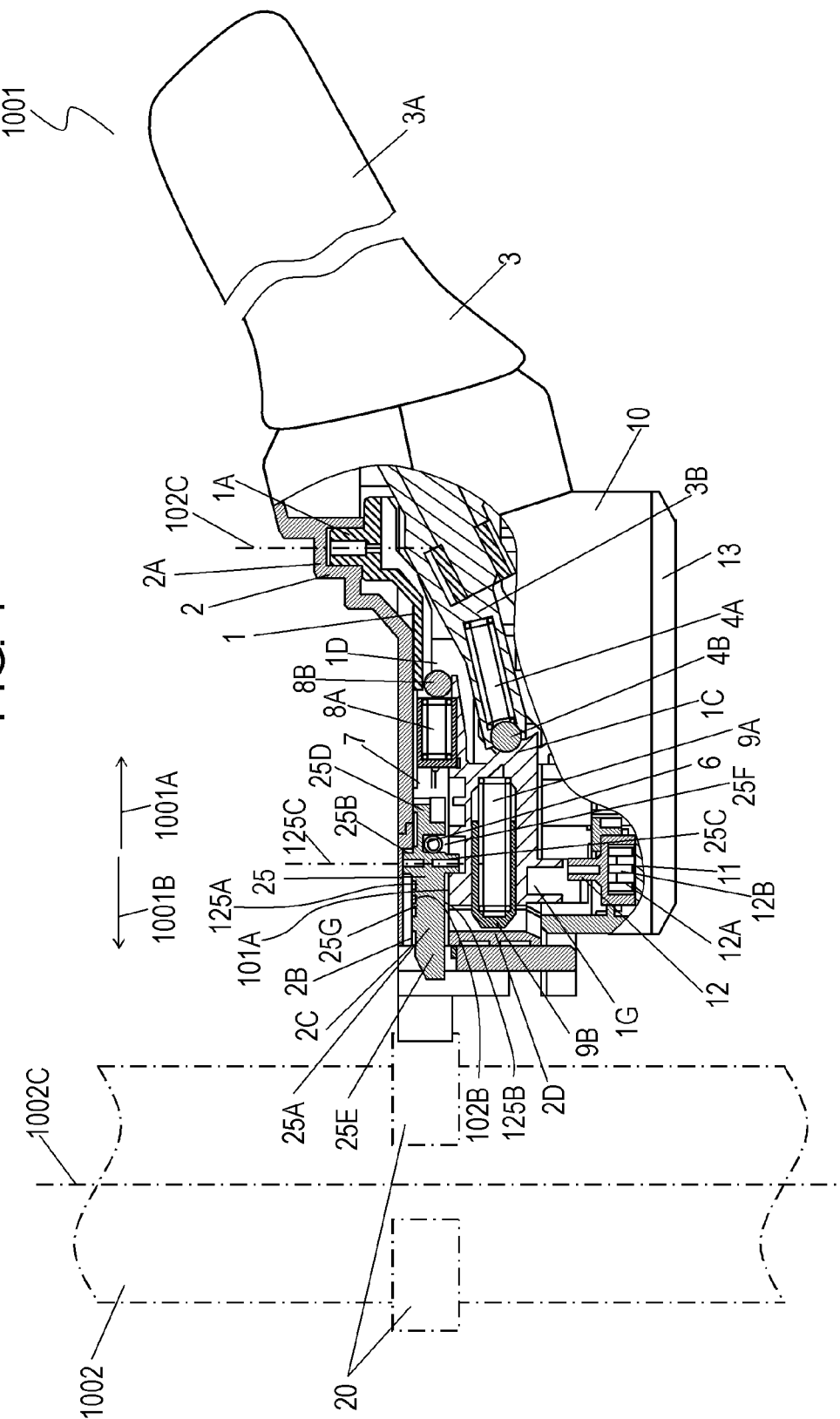
FIG. 1 is a partial cutaway view of a turning direction indicator device according to an exemplary embodiment of the present invention.
Figure 2:
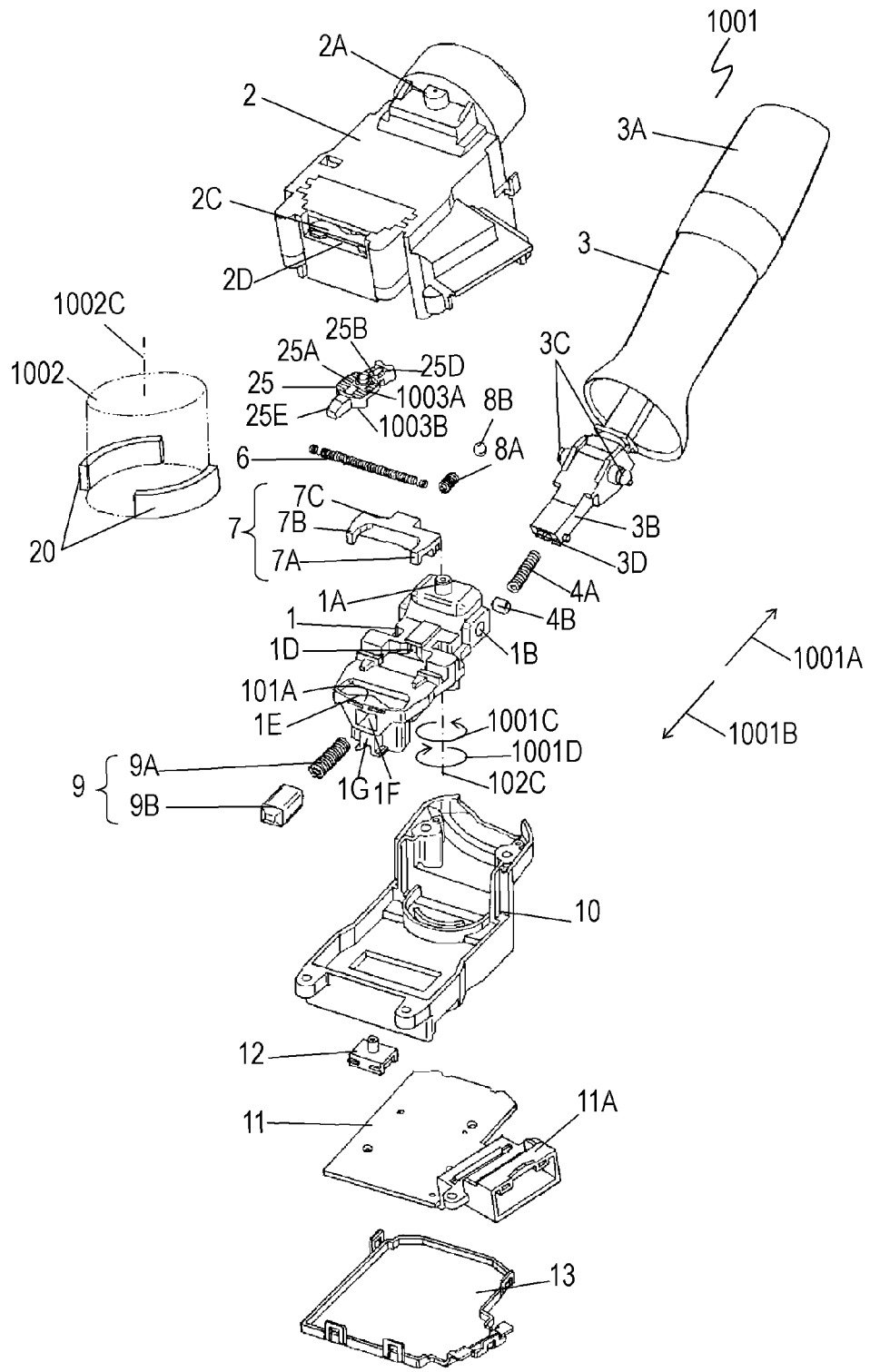
FIG. 2 is an exploded perspective view of the turning direction indicator device according to the embodiment.

FIGS. 1 and 2 are a partial cutaway view and an exploded perspective view of turning direction indicator device 1001 according to an exemplary embodiment of the present invention, respectively. Turning direction indicator device 1001 is installed below a steering wheel located in front of a driver's seat in an automobile. Steering shaft 1002 rotates in accordance with a rotation of the steering wheel rotated by a driver. Cancel cams 20 rotate about rotation axis 1002C as steering shaft 1002 rotates. Actuator 1 is made of an insulating resin, such as polyoxymethylene. Cover 2 having a substantially box shape is made of an insulating resin, such as polyamide. Cover 2 accommodates actuator 1 therein. Actuator 1 includes shaft part 1A projecting from an upper surface and extending along rotation axis 102C. Rotation axis 102C is parallel to rotation axis 1002C. Bearing part 2A that is concave upward is provided at a front side lower surface of cover 2. Bearing part 2A pivotally supports shaft part 1A of actuator 1. Actuator 1 is rotatable with reference to cover 2 about rotation axis 102C along which shaft part 1A extends, in leftward direction 1001C and rightward direction 1001D opposite to leftward direction 1001C.

Operating lever 3 is made of an insulating resin, such as ABS resin or polyamide. At a tip of operating lever 3, substantially cylindrical operating part 3A is provided. At a root of operating lever 3, driver part 3B that extends from operating part 3A toward actuator 1 is provided.

Shaft part 3C projects from each side of driver part 3B. Each shaft part 3C is pivotally supported by shaft hole 1B provided in each side surface of the front part of actuator 1. Hole 3D is provided in an end part of driver part 3B. Click spring 4A and click pin 4B are inserted into hole 3D. Click pin 4B elastically contacts uneven-shaped click cam 1C that is provided at the lower part of actuator 1. Click spring 4A, click pin 4B, and click cam 1C attach operating lever 3 to actuator 1 such that operating lever 3 can rotate upward and downward about shaft part 3C with a click feel.

Cam body 25 made of an insulating resin, such as polyoxymethylene, is placed on upper surface 101A of actuator 1. Cam body 25 has upper surface 125A and lower surface 125B opposite to upper surface 125A. Cam body 25 includes base part 25A, upper shaft part 25B projecting from upper surface 125A at base part 25A, lower shaft part 25C projecting from lower surface 125B and extending coaxially with upper shaft part 25B, rear cam part 25E projecting and extending from base part 25A, and front cam part 25D projecting and extending from base part 25A. Rear cam part 25E projects and extends from base part 25A in rearward direction 1001B toward rotation axis 1002C, i.e., cancel cams 20. Front cam part 25D projects and extends from base part 25A in frontward direction 1001A opposite to rearward direction 1001B. Upper shaft part 25B and lower shaft part 25C project from upper surface 125A and lower surface 125B at base part 25A, respectively, and extend along rotation axis 125C that is parallel to rotation axis 1002C.

Figure 3:
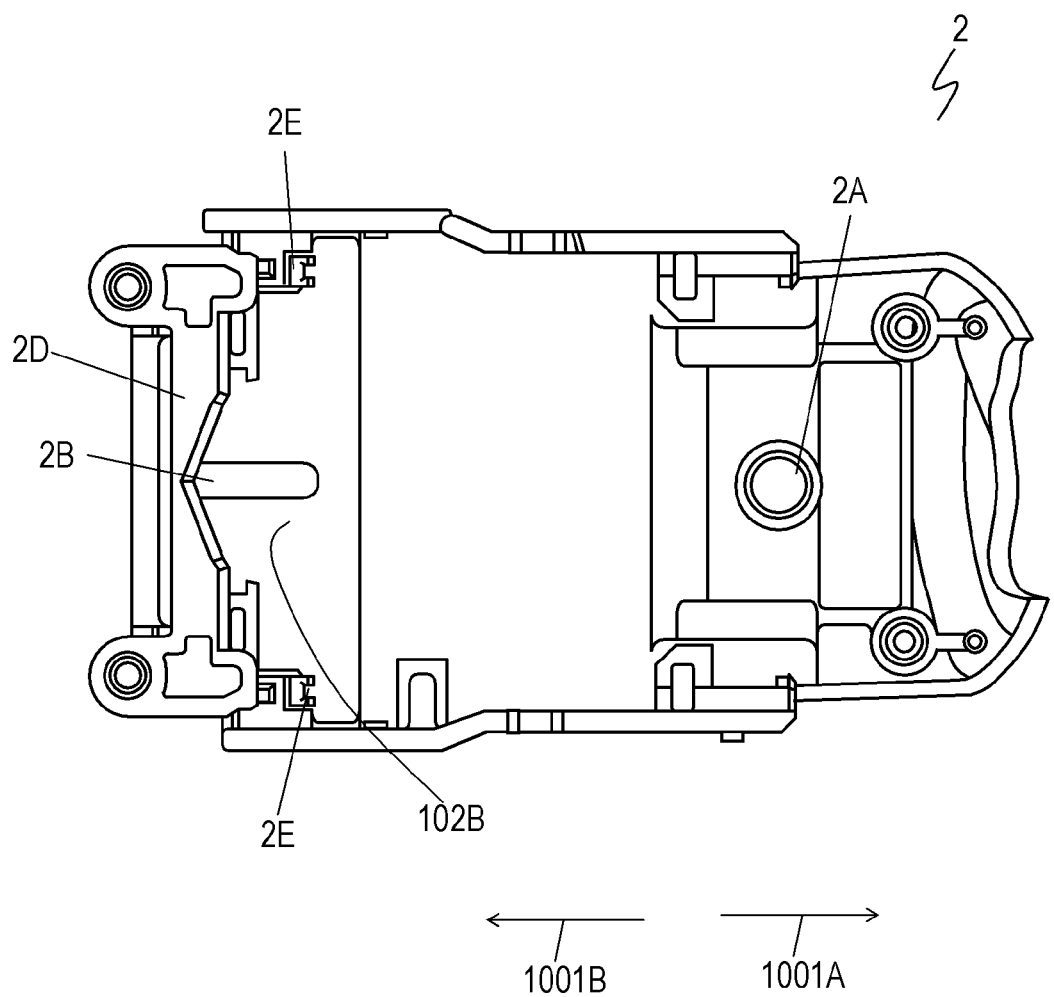
FIG. 3 is a bottom view of a cover of the turning direction indicator device according to the embodiment.

FIG. 3 is a bottom view of cover 2. Long hole-shaped guide groove 2B provided in lower surface 102B of cover 2 extends in direction 1001A (1001B) and is concave upward. Upper shaft part 25B of cam body 25 engages with guide groove 2B, whereby cam body 25 is retained at cover 2 so as to be capable of shifting in directions 1001A and 1001B. That is, upper shaft part 25B, lower shaft part 25C, and rotation axis 125C can shift in frontward direction 1001A and rearward direction 1001B with respect to cover 2 along guide groove 2B. Further, cam body 25 is rotatable with respect to cover 2 about rotation axis 125C along which upper shaft part 25B and lower shaft part 25C extend. Base part 25A has a shape, such as an elongated circular shape or a racetrack shape, elongated in direction 1001A (1001B).

Figure 4A:
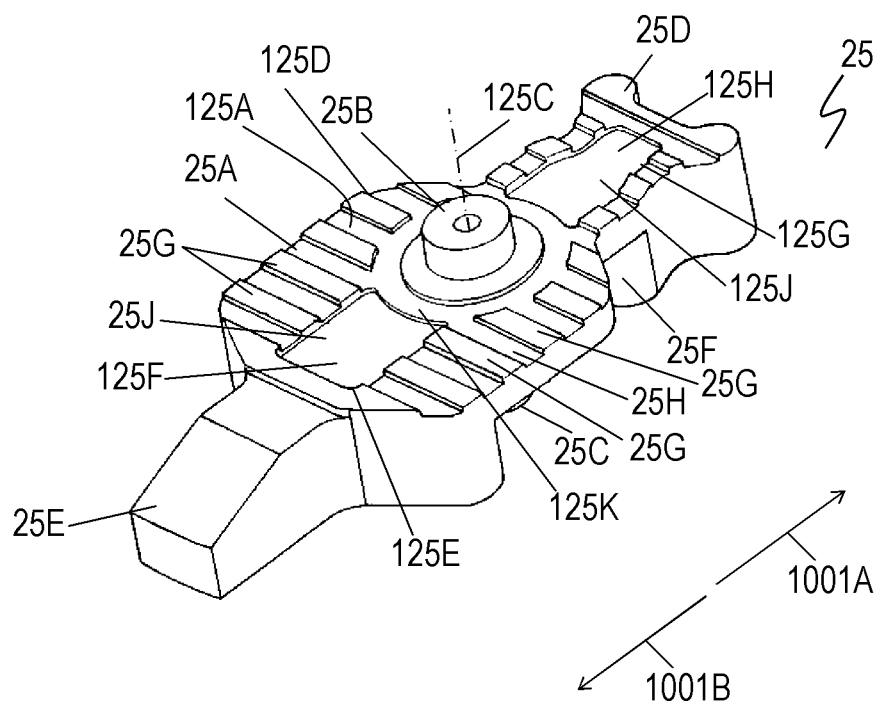
FIGS. 4A and 4B are a top perspective view and a bottom perspective view of a cam body of the turning direction indicator device according to the embodiment, respectively.

FIG. 4A is a top perspective view of cam body 25. Ridges 25G project upward from upper surface 125A of cam body 25 at and around base part 25A. Ridges 25G extend in parallel to one another at predetermined intervals in between in a direction substantially perpendicular to direction 1001A (1001B). Grease-retaining recesses 25J and 125J having bottoms 125F and 12511 are provided in upper surface 125A of base part 25A at a level lower than upper surface 125A, respectively. Grease-retaining recesses 25J and 125J are positioned opposite to each other with reference to upper shaft part 25B. Grease-retaining recess 25J is positioned in rearward direction 1001B from upper shaft part 25B. Grease-retaining recess 125J is positioned in frontward direction 1001A from upper shaft part 25B. Upper surface 125A of cam body 25 has outer edge 125D. Grease-retaining recesses 25J and 125J have outer edges 125E and 125G, respectively. Outer edge 125E of grease-retaining recess 25J is entirely inward away from outer edge 125D of upper surface 125A of cam body 25 and positioned inside upper surface 125A. Outer edge 125G of grease-retaining recess 125J is entirely inward away from outer edge 125D of upper surface 125A of cam body 25 and positioned inside upper surface 125A. Upper surface 125A has flat part 125K surrounding the entire circumference of upper shaft part 25B. Ridges 25G are not provided in flat part 125K, that is, flat part 125K is flat. Upper surface 125A has grooves 25H each formed between ridges 25G.

Figure 4B:
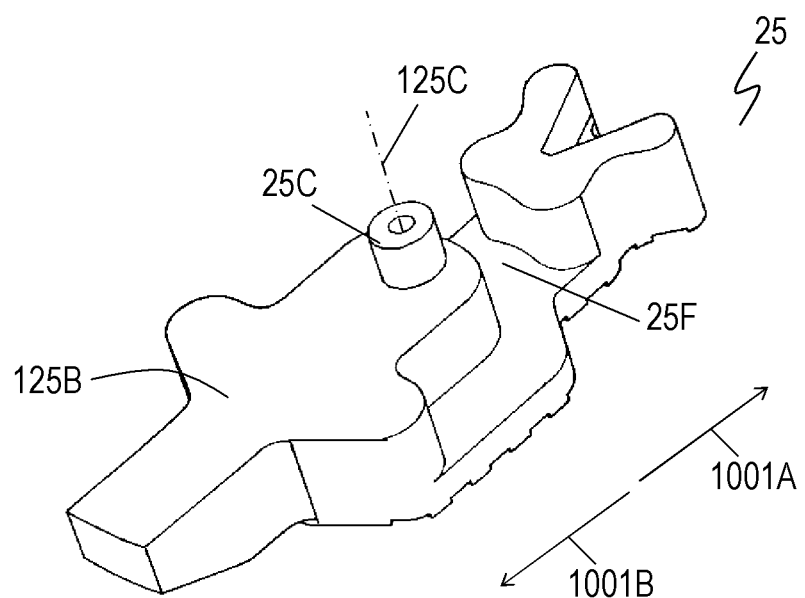

FIG. 4B is a bottom perspective view of cam body 25. Lower surface 125B of cam body 25 has engaging recess 25F provided therein. Engaging recess 25F is positioned from lower shaft part 25C in frontward direction 1001A. Engaging recess 25F extends perpendicularly to direction 1001A (1001B), and passes throughout from a side surface of cam body 25 to the opposite side surface thereof along lower surface 125B.

Grease 1003A (see FIG. 2) is applied between upper surface 125A of cam body 25 and lower surface 102B of cover 2, so as to avoid sliding friction between lower surface 102B of cover 2 and upper surface 125A of cam body 25. Grease 1003A suppresses any rapid movement of cam body 25 by resistance due to, e.g. viscosity of grease 1003A.

Grease 1003B (see FIG. 2) is applied between lower surface 125B of cam body 25 and upper surface 101A of actuator 1, so as to avoid sliding friction between upper surface 101A of actuator 1 and lower surface 125B of cam body 25. Grease 1003B suppresses any rapid movement of cam body 25 by resistance due to, e.g. viscosity of grease 1003B.

As shown in FIGS. 1 to 3, the opposite ends of urging spring 6, a coil spring, are engaged with engaging parts 2E provided at the lower surface of cover 2. The center portion of urging spring 6 is engaged with engaging recess 25F of cam body 25 to urge cam body 25 in rearward direction 1001B.

Release element 7 is made of an insulating resin, such as polyoxymethylene. Release element 7 includes coupling part 7C and release projecting parts 7A and 7B that project from respective ones of the opposite ends of coupling part 7C in rearward direction 1001B so as to open in rearward direction 1001B to form a substantially squared C-shape. Coupling part 7C has a hole therein that opens in frontward direction 1001A. The hole accommodates retaining spring 8A and ball 8B therein. Ball 8B faces and elastically contacts retaining recess 1D of actuator 1. Release element 7 is coupled to actuator 1, and rotates together with actuator 1 about shaft part 1A. Release element 7 is retained substantially on the middle of upper surface 101A of actuator 1, so as to be capable of shifting in directions 1001C and 1001D along upper surface 101A with a load equal to or larger than a predetermined load.

Hole 1F that opens in rearward direction 1001B is provided in the end part of actuator 1. Hole 1F of actuator 1 accommodates therein click pin 9B and click spring 9A which is compressed. Click pin 9B faces and elastically contacts click cam 2D of cover 2. Click spring 9A, click pin 9B, and click cam 2D constitute retainer unit 9. When operating lever 3 rotates in directions 1001C and 1001D, retainer unit 9 retains actuator 1 at the neutral position, the first operational position, and the second operational position while giving a click feel.

Case 10 opens upward, and is made of an insulating resin, such as polybutylene terephthalate. Case 10 pivotally supports actuator 1 so as to allow actuator 1 to rotate about rotation axis 102C. Case 10 covers an opening of cover 2 that opens downward, to accommodate components, such as actuator 1 having operating lever 3 attached thereto and cam body 25.

Wiring patterns are formed on upper and lower surfaces of wiring board 11 made of an insulating resin. A fixed contact is provided on the upper surface. Connector part 11A is provided on wiring board 11. The upper end of slider 12 engages with driver recess 1G of actuator 1. Movable contact 12B fixed to the lower surface of slider 12 slides while elastically contacting the fixed contact, thereby performing electrical connection and disconnection between movable contact 12B and fixed contact. Movable contact 12B and the fixed contact constitute switch contact part 12A.

Rotation of actuator 1 associated with the rotation of operating lever 3 in directions 1001C and 1001D causes electrical connection and disconnection of switch contact part 12A. Bottom plate 13 covers the lower surface of wiring board 11, to structure turning direction indicator device 1001.

FIG. 4C is a top schematic view of automobile 2001 having turning direction indicator device 1001 installed therein. Automobile 2001 includes vehicle body 2002, turn-signal lamps 2004A and 2004B installed onto vehicle body 2002, driver's seat 2005 installed in vehicle body 2002, steering wheel 2006 located in front of driver's seat 2005, and electronic circuit 2003. Turning direction indicator device 1001 is installed below steering wheel 2006 while operating part 3A projects outward.

Figure 5A:
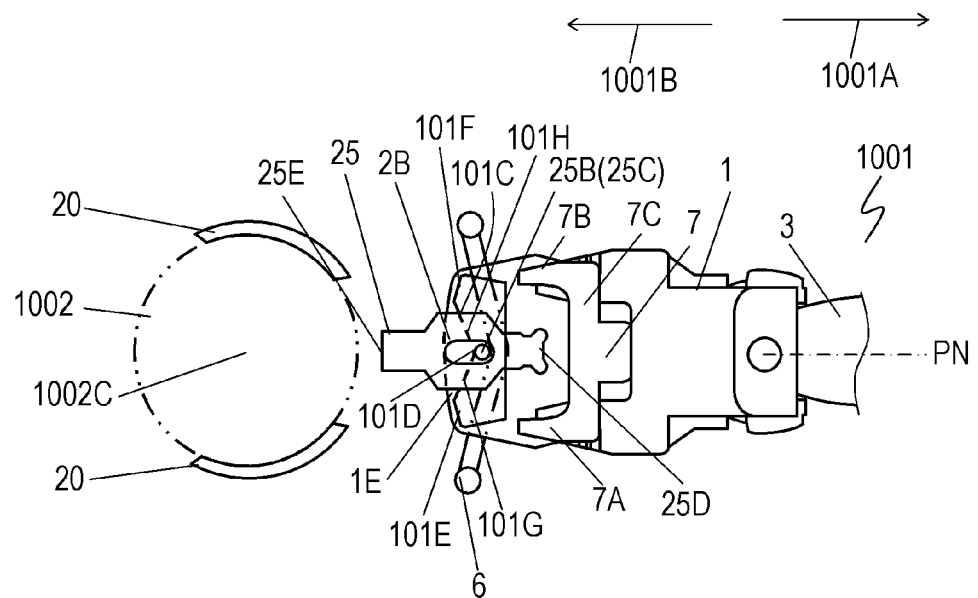
FIGS. 5A to 5D are top schematic views of the turning direction indicator device according to the embodiment for illustrating an operation of the turning direction indicator device.

FIGS. 5A to 5D are top schematic views of turning direction indicator device 1001 for describing an operation of turning direction indicator device 1001. As shown in FIG. 5A, substantially arcuate cancel cams 20 that rotate in accordance with the rotation of steering shaft 1002 are disposed near actuator 1 and in rearward direction 1001B from actuator 1. Rear cam part 25E of cam body 25 projects outward from opening 2C (see FIG. 2) of cover 2. A lead wire for external connection is coupled to connector part 11A of wiring board 11, and connects switch contact part 12A electrically to electronic circuit 2003 of automobile 2001.

Figure 6A:
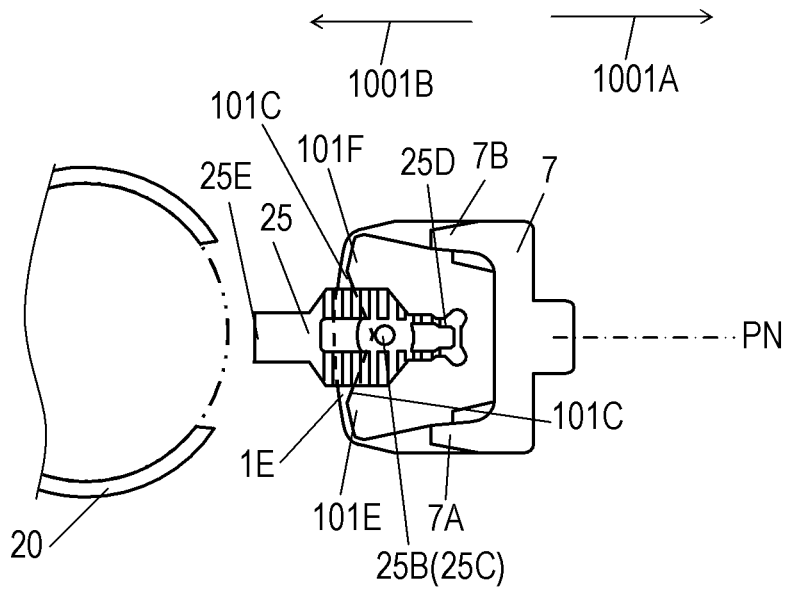
FIGS. 6A to 6D are top schematic views of the turning direction indicator device according to the embodiment for illustrating an operation of the turning direction indicator device.

FIGS. 6A to 6D are top schematic views of turning direction indicator device 1001 for particularly illustrating an operation of cam body 25. Actuator 1 includes retainer cam 1E having edge 101C. Retainer cam 1E has a substantially triangular shape having apex 101D projecting in direction 1001A and end parts 101E and 101F. Edge 101C includes straight angled edge 101G and straight angled edge 101H. Angled edge 101G extends from apex 101D to end part 101E. Angled edge 10111 extends from apex 101D to end part 101F. As shown in FIGS. 5A and 6A, when operating lever 3 is retained at neutral position PN, cam body 25 is urged with urging spring 6 in rearward direction 1001B toward cancel cam 20. Here, lower shaft part 25C elastically contacts apex 101D of retainer cam 1E to position rear cam part 25E at a non-abutting position where rear cam part 25C is located outwardly away from a rotary orbit of cancel cams 20 and cannot abut on cancel cams 20. Front cam part 25D is located at substantially the intermediate position between release projecting parts 7A and 7B of release element 7.

Figure 5B:
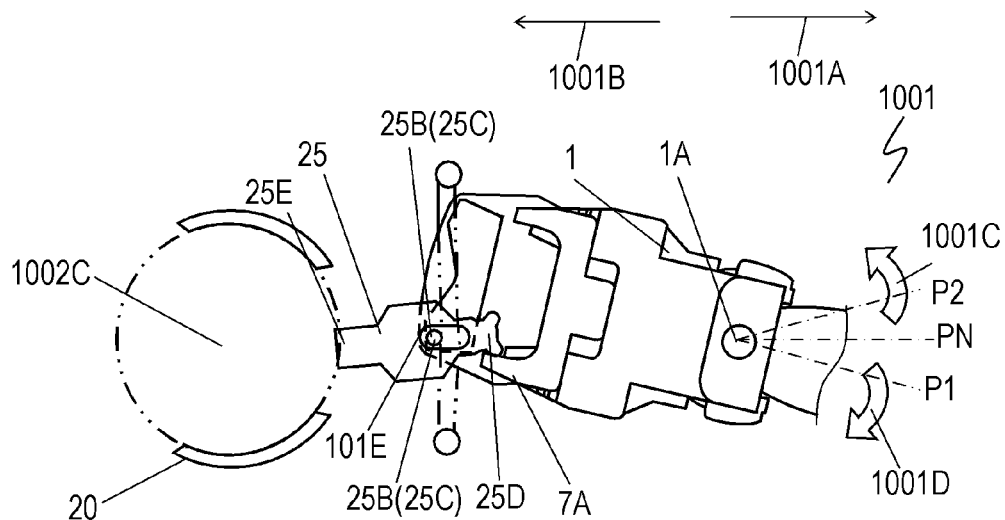
Figure 6B:
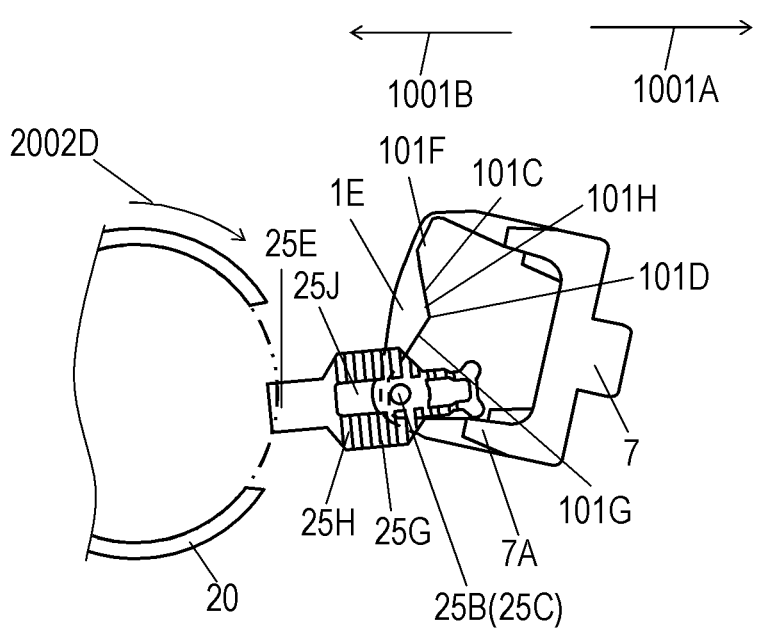

For example, when the driver rotates operating lever 3 clockwise in rightward direction 1001D upon turning the automobile rightward, as shown in FIGS. 5B and 6B, operating lever 3 rotates together with actuator 1 about shaft part 1A of actuator 1. Then, actuator 1 is retained by retainer unit 9 (see FIG. 2) at first operational position P1 where actuator 1 has rotated in rightward direction 1001D by a predetermined angle, and operating lever 3 is retained at first operational position P1.

During the period from when actuator 1 leaves neutral position PN until when actuator 1 is retained at first operational position P1, lower shaft part 25C of cam body 25 slides from apex 101D along angled edge 101G of retainer cam 1E while maintaining elastic contact, to shift to end part 101E. When lower shaft part 25C shifts along angled edge 101G to end part 101E, upper shaft part 25B of cam body 25 shifts along guide groove 2B in rearward direction 1001B as being urged by urging spring 6.

When cam body 25 shifts in rearward direction 1001B, rear cam part 25E of cam body 25 shifts to an abuttable position where rear cam part 25E of cam body 25 can abut on cancel cam 20 in the rotary orbit of cancel cams 20. At this moment, a tip of front cam part 25D abuts on an inner side surface of release projecting part 7A. Here, grease 1003A retained in groove 25H between ridges 25G of cam body 25 and grease 1003A retained in grease-retaining recesses 25J and 125J also shift in accordance with the movement of cam body 25.

In accordance with the rotation of operating lever 3 and actuator 1 to first operational position P1, slider 12 engaged with driver recess 1G slides on wiring board 11, thereby performing electrical connection and disconnection of switch contact part 12A. An electric signal produced by the electrical connection and disconnection of switch contact part 12A allows electronic circuit 2003 to flash on and off the right turn-signal lamp 2004B (see FIG. 4C).

Figure 5C:
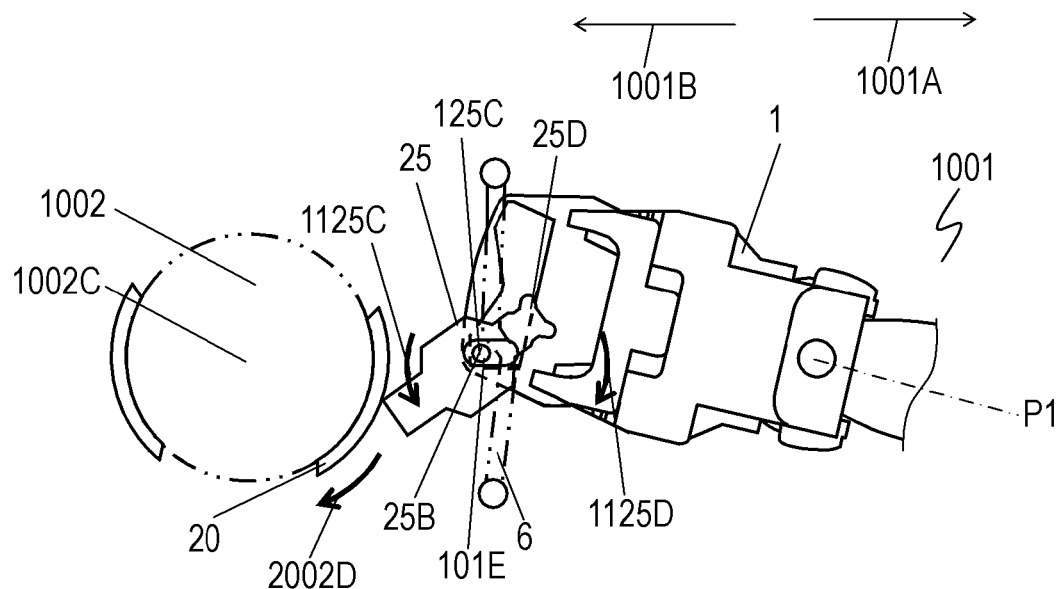
Figure 6C:
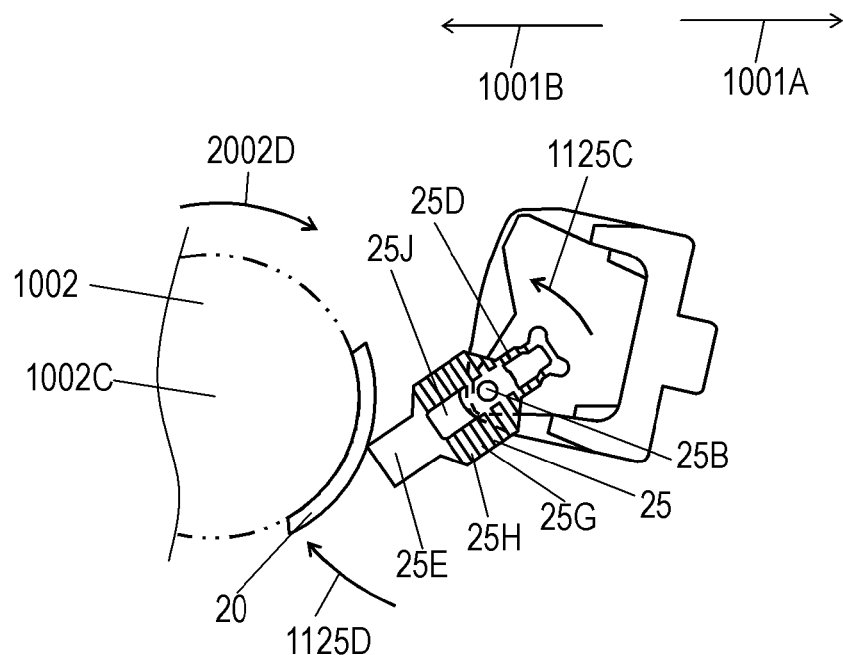

Next, the driver rotates steering wheel 2006 clockwise in a rightward direction for turning the automobile 2001 rightward. At this moment, as shown in FIGS. 5C and 6C, cancel cams 20 rotate clockwise in direction 2002D about rotation axis 1002C as steering wheel 2006 and steering shaft 1002 rotate. Accordingly, cancel cam 20 abuts on rear cam part 25E of cam body 25, and then, rotates cam body 25 counterclockwise in direction 1125C about upper shaft part 25B. At this moment, cancel cam 20 restricts the rotation of cam body 25 in direction 1125D which is opposite to direction 1125C. In accordance with the rotation of cam body 25, urging spring 6 engaged with engaging recess 25F bends, and front cam part 25D is removed away from release projecting part 7A while increasing an urging force of spring 6 in clockwise direction 1125D which is opposite to direction 1125C.

Figure 9:
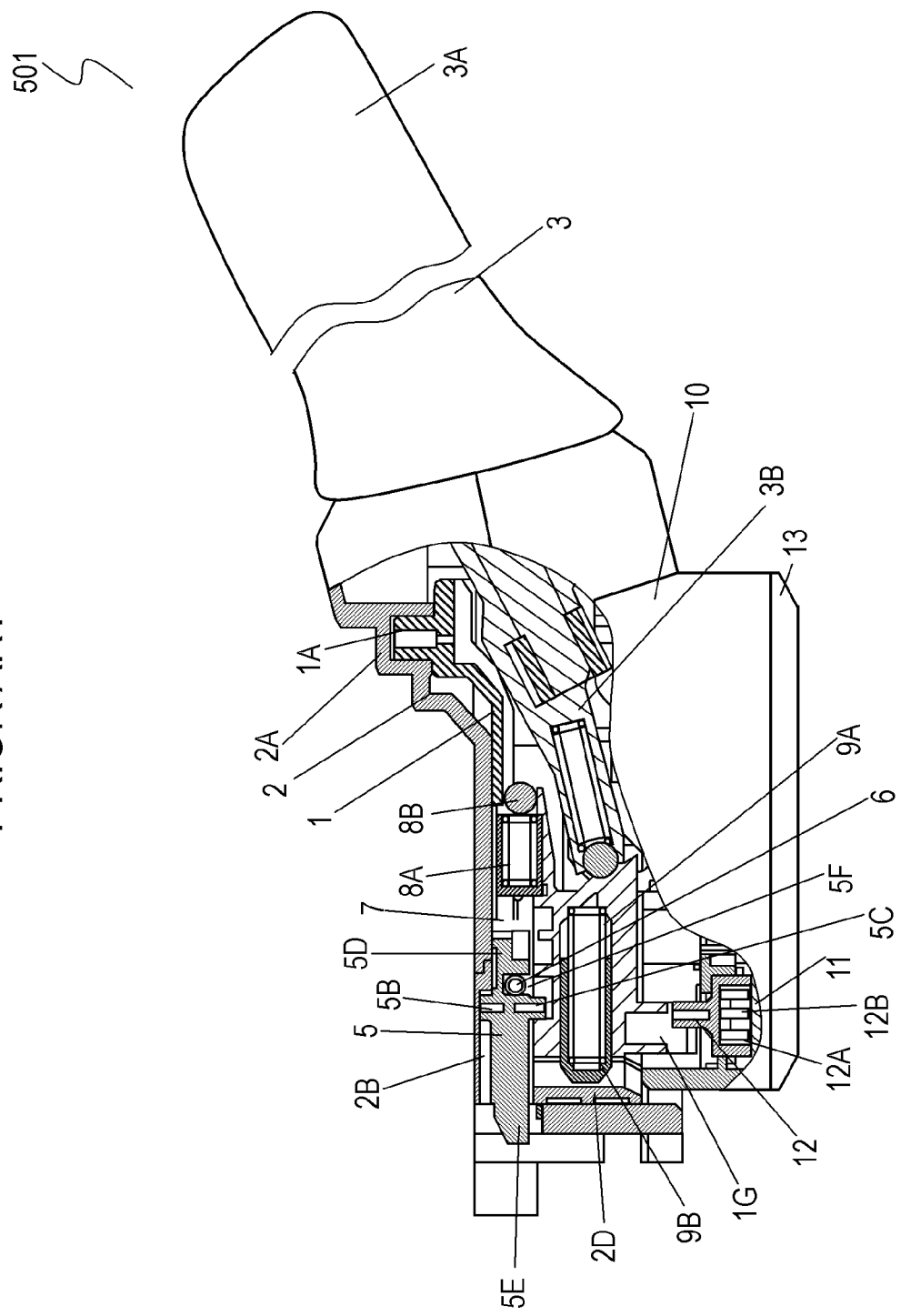
FIG. 9 is a partial cutaway view of a conventional turning direction indicator device.
Figure 10:
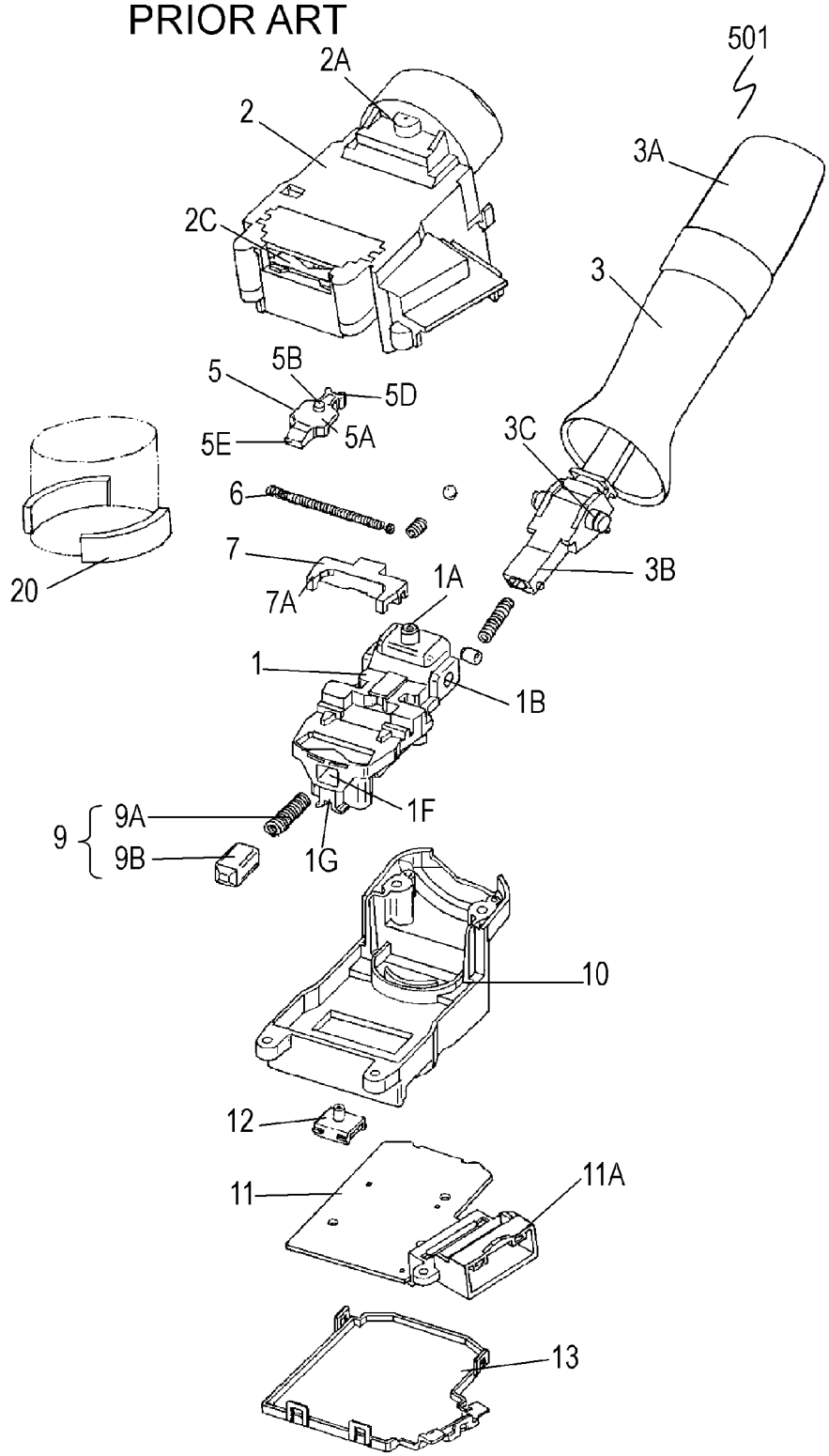
FIG. 10 is an exploded perspective view of the conventional turning direction indicator device.
Figure 11A:
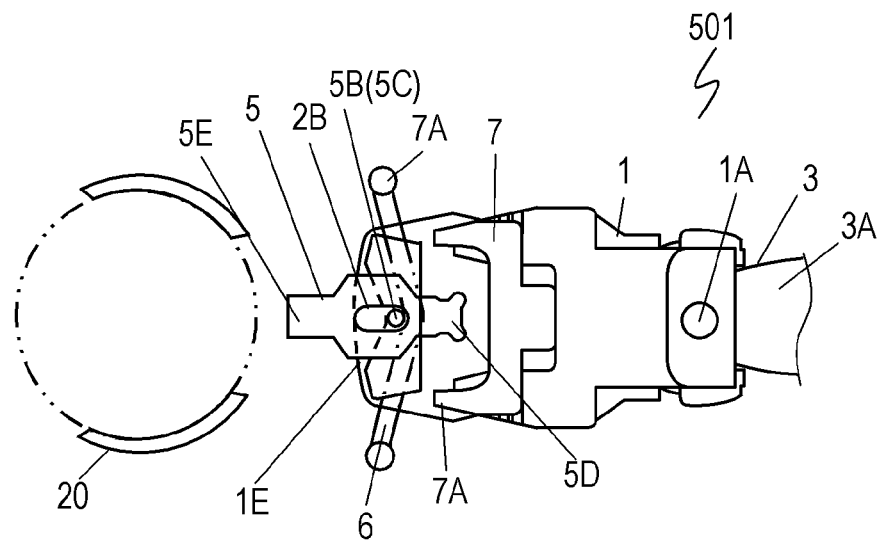
FIGS. 11A and 11B are top schematic views of the conventional turning direction indicator device for illustrating an operation of the conventional turning direction indicator device.
Figure 11B:
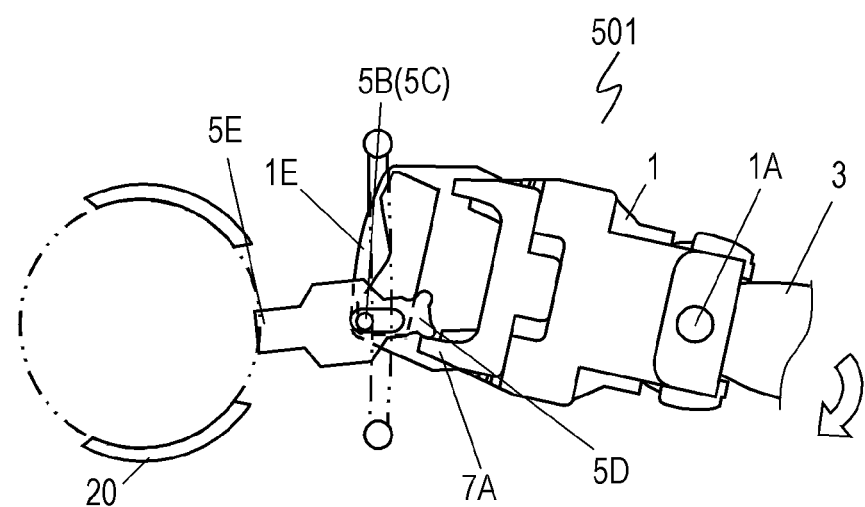

In conventional turning direction indicator device 501 shown in FIGS. 9 and 10, the upper surface of cam body 5 is flat. Accordingly, when being used for a long period of time, the grease applied between the upper surface of base part 5A of cam body 5 and the lower surface of cover 2 is expelled from the sliding range toward the outside. This reduces the resistance which is produced by the grease and which exerts over the movement of cam body 5, and causes front cam part 5D to hit release projecting part 7A with a relatively large impact force, which is prone to result in a large hitting noise.

In turning direction indicator device 1001 according to the present embodiment, each of ridges 25G is aligned substantially perpendicularly to direction 1001B in which cam body 25 shifts. Accordingly, even when cam body 25 rotates about upper shaft part 25B throughout a long period of use, grease 1003A is less prone to be expelled from upper surface 125A of cam body 25. Grease-retaining recesses 25J and 125J also securely retain grease 1003A and 1003B therein, respectively. Further, despite the rotation of cam body 25, flat part 125K that entirely surrounds upper shaft part 25B also securely retains grease 1003A.

Figure 5D:
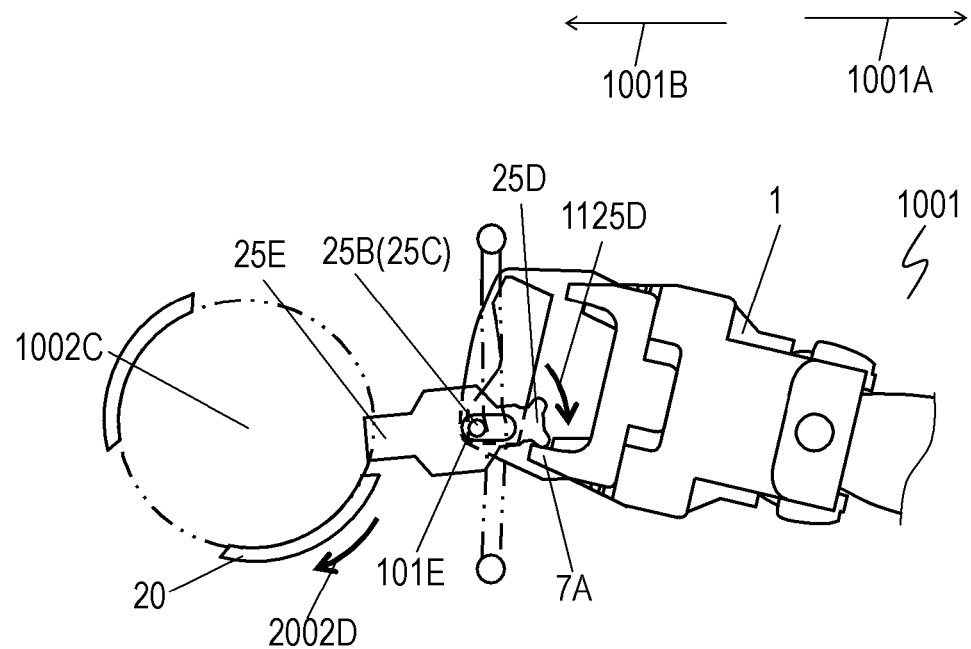
Figure 6D:
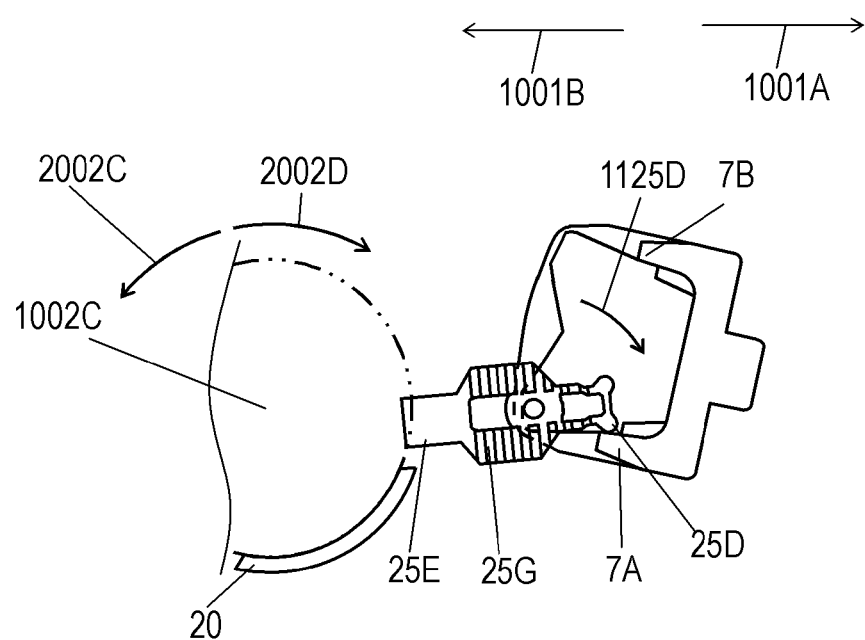

As this clockwise rotary operation of the steering wheel further proceeds in direction 2002D, as shown in FIGS. 5D and 6D, rear cam part 25E elastically contacting cancel cam 20 is removed away from cancel cam 20. This movement releases the restriction of the clockwise rotation of cam body 25 in direction 1125D caused by cancel cam 20. Accordingly, cam body 25 is urged by urging spring 6 clockwise in direction 1125D, and consequently, front cam part 25D hits the inner side surface of release projecting part 7A of release element 7.

Viscous grease 1003A is applied between ridges 25G on upper surface 125A of cam body 25 and lower surface 102B of cover 2 and between grease-retaining recesses 25J and 125J and lower surface 102B of cover 2. Accordingly, while upper surface 125A of cam body 25 slides on lower surface 102B of cover 2 and rotates, ridges 25G and grease 1003A produce resistance in between, which reduces the rotation speed of the urged cam body 25. This reduces the impact force of front cam part 25D abutting on release projecting part 7A of release element 7. Therefore, the hitting noise produced by front cam part 25D hitting release projecting part 7A becomes much smaller than a noise produced by the hitting of cam body 5 having a flat upper surface.

Figure 7A:
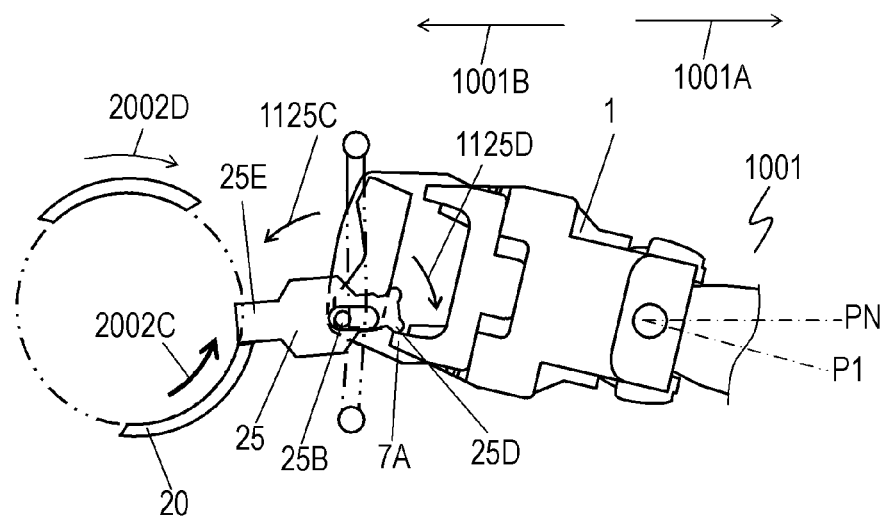
FIGS. 7A to 7C are top schematic views of the turning direction indicator device according to the embodiment for illustrating an operation of the turning direction indicator device.
Figure 7B:
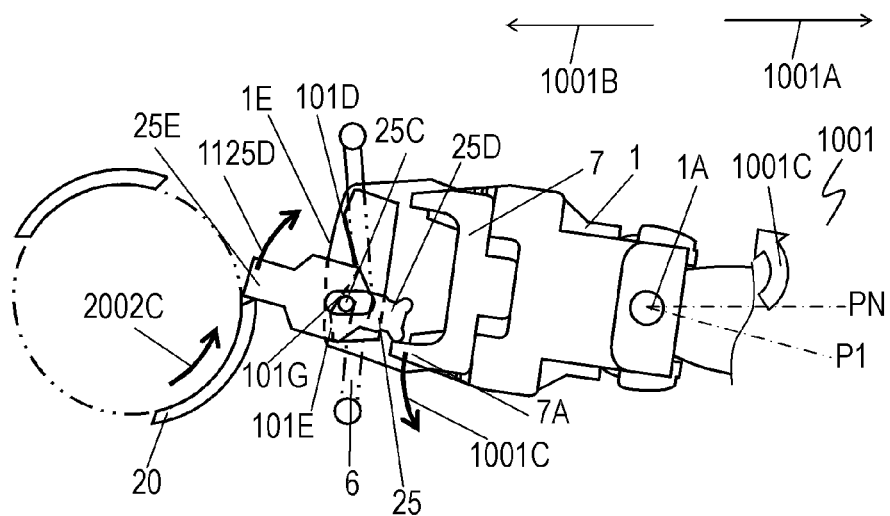
Figure 7C:
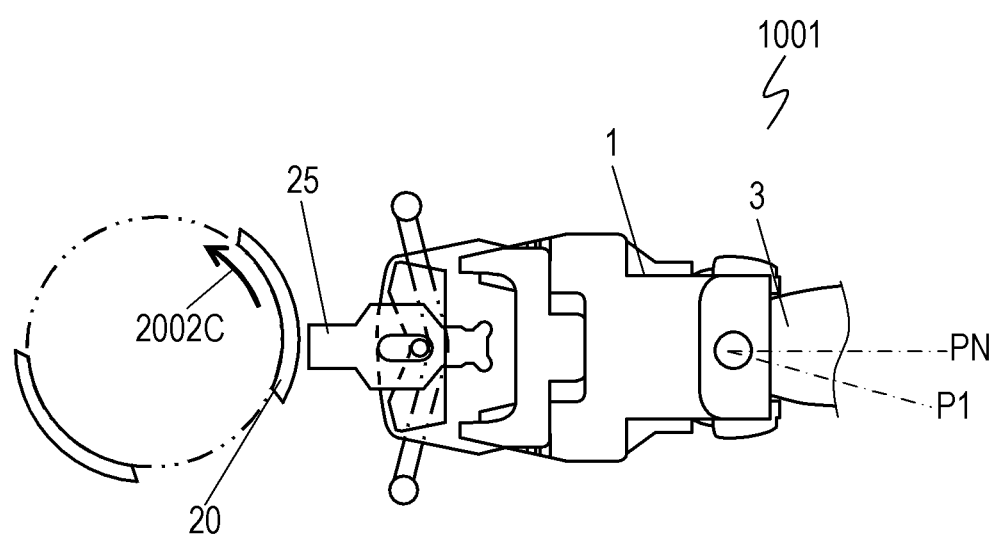

FIGS. 7A to 7C are top schematic views of turning direction indicator device 1001 for illustrating an operation of turning direction indicator device 1001. When the driver has finished turning automobile 2001 and is to return steering wheel 2006 to an original neutral position, steering wheel 2006 rotates steering shaft 1002 in leftward direction 2002C which is opposite to rightward direction 2002D. As shown in FIG. 7A, this rotation allows cancel cam 20 to push rear cam part 25E in leftward direction 2002C to rotate cam body 25 clockwise about upper shaft part 25B in direction 1125D which is opposite to direction 1125C. As shown in FIG. 7B, the rotation of cam body 25 allows front cam part 25D to push release projecting part 7A of release element 7 in direction 1001C, thereby causing actuator 1 to rotate about shaft part 1A counterclockwise in direction 1001C. Here, lower shaft part 25C of cam body 25 slides from end part 101E along angled edge 101G to apex 101D of retainer cam 1E. Thus, cam body 25 shifts in frontward direction 1001A to the non-abutting position where rear cam part 25E cannot abut on cancel cam 20.

As front cam part 25D rotates actuator 1 counterclockwise in direction 1001C, as shown in FIG. 7C, actuator 1 together with operating lever 3 returns from first operational position P1 to neutral position PN, and is retained by retainer unit 9. In response, switch contact part 12A performs electrical connection and disconnection, whereby electronic circuit 2003 turns off turn-signal lamp 2004B having been flashing on and off.

As described above, when actuator 1 is at neutral position PN, cam body 25 operates to shift to the non-abutting position where rear cam part 25E cannot abut on cancel cam 20. Further, when actuator 1 is at first operational position P1, cam body 25 operates to shift to the abuttable position where rear cam part 25E can abut on cancel cam 20. At this moment, the rotation of the cancel cam 20 causes cam body 25 to rotate actuator 1 via release element 7 such that actuator 1 returns to neutral position PN.

When the driver turns automobile 2001 leftward, the driver rotates operating lever 3 to second operational position P2 (see FIG. 5B) in leftward direction 2002C. Thus, actuator 1 is retained by retainer unit 9 at second operational position P2 where actuator 1 has rotated counterclockwise in direction 1001C by a predetermined angle. Here, actuator 1, cam body 25 and others rotate in the opposite directions to above described directions. As cancel cam 20 rotates in direction 2002C in accordance with a rotation of steering shaft 1002, front cam part 25D of cam body 25 hits release projecting part 7B of release element 7. Here, grease 1003A retained in ridges 25G on upper surface 125A of cam body 25 allows cam body 25 to abut on release projecting part 7B at a low speed. Accordingly, the hitting noise produced by such an abutting operation can be reduced.

As described above, when actuator 1 is at second operational position P2, cam body 25 operates to shift to the abuttable position where rear cam part 25E can abut on cancel cam 20. At this moment, the rotation of cancel cam 20 causes cam body 25 to rotate actuator 1 via release element 7 such that actuator 1 returns to neutral position PN.

In this manner, in accordance with the rotating operation of operating lever 3 in the rightward and leftward directions, cam body 25 shifts in frontward direction 1001A and rearward direction 1001B along retainer cam 1E. At this moment, grease 1003A retained in groove 25H between ridges 25G shifts together with cam body 25. Thus, grease 1003A easily remains on upper surface 125A of cam body 25.

Further, even when turning direction indicator device 1001 is used for a long period of time under various environments, such as changes in temperature or humidity, a predetermined amount of grease 1003A is constantly retained in grease-retaining recesses 25J and 125J, and is also spread over surfaces of ridges 25G while cam body 25 moves. Accordingly, grease 1003A is retained between cam body 25 and cover 2.

Grease 1003A and 1003B are preferably made of synthetic oil-based grease, which exhibits stable characteristics, such as viscosity, when used even in the temperature range where turning direction indicator device 1001 is used, i.e., the temperatures ranging from a low temperature of −30° C. to a high temperature of 90° C., and consistency of 200 to 350.

The height of ridges 25G from upper surface 125A is preferably 0.05 to 1 mm. This height facilitates retention of the grease in groove 25H between ridges 25G when cam body 25 slides on cover 2 in the frontward rearward directions and rotates with respect to cover 2 in the rotating directions. Further, ridges 25G moves on to function as walls against the grease. This structure facilitates producing higher resistance than that produced by cam body 5 having the flat upper surface.

The depth of grease-retaining recesses 25J and 125J from upper surface 125A at base part 25A is preferably 0.05 to 1 mm. This depth allows a predetermined amount of the grease to be retained in grease-retaining recesses 25J and 125J and held there when cam body 25 slides on lower surface 102B of cover 2. This facilitates the grease to be spread and supplied to ridges 25G and grooves 25H.

It is to be noted that, as the driver rotates operating lever 3 upward and downward, electrical connection and disconnection of the corresponding switch contact part in actuator 1 is carried out, and electronic circuit 2003 switches between high beam and low beam of the headlights.

Thus, in turning direction indicator device 1001 according to the present embodiment, cam body 25 is retained so as to be capable of shifting in frontward direction 1001A and rearward direction 1001B, and so as to be rotatable, between lower surface 102B of cover 2 and upper surface 101A of actuator 1. Ridges 25G are provided on upper surface 125A of cam body 25. Grease 1003A is provided between ridges 25G on upper surface 125A of cam body 25 and cover 2. When cam body 25 shifts and rotates in accordance with the rotating operation of operating lever 3 and the rotation of cancel cam 20, grease 1003A is retained between ridges 25G. Grease 1003A remains on upper surface 125A of cam body 25 substantially uniformly, and is less prone to be expelled to the outside of the sliding range of cam body 25. Hence, resistance due to grease 1003A between ridges 25G of cam body 25 and lower surface 102B of cover 2 is stably produced. When cam body 25 hits release projecting part 7A or 7B of release element 7 by the urging force of urging spring 6, cam body 25 rotates at a low speed and the impact force is suppressed. Accordingly, the hitting noise produced by the hitting becomes small, thus allowing turning direction indicator device 1001 to operate reliably with a low noise.

Grease-retaining recesses 25J and 125J formed between ridges 25G are provided in upper surface 125A of cam body 25. In accordance with shift and rotation of cam body 25, grease 1003A is securely retained also in grease-retaining recesses 25J and 125J, as well as between ridges 25G. Accordingly, even when being used for a long period of time under various environments, grease 1003A is scarcely removed from between cam body 25 and cover 2, and consequently, stabilizes the resistance when cam body 25 operates. Hence, it becomes possible to obtain turning direction indicator device 1001 that more stably produces small hitting noise of cam body 25, i.e., operates with a low noise.

Figure 8A:
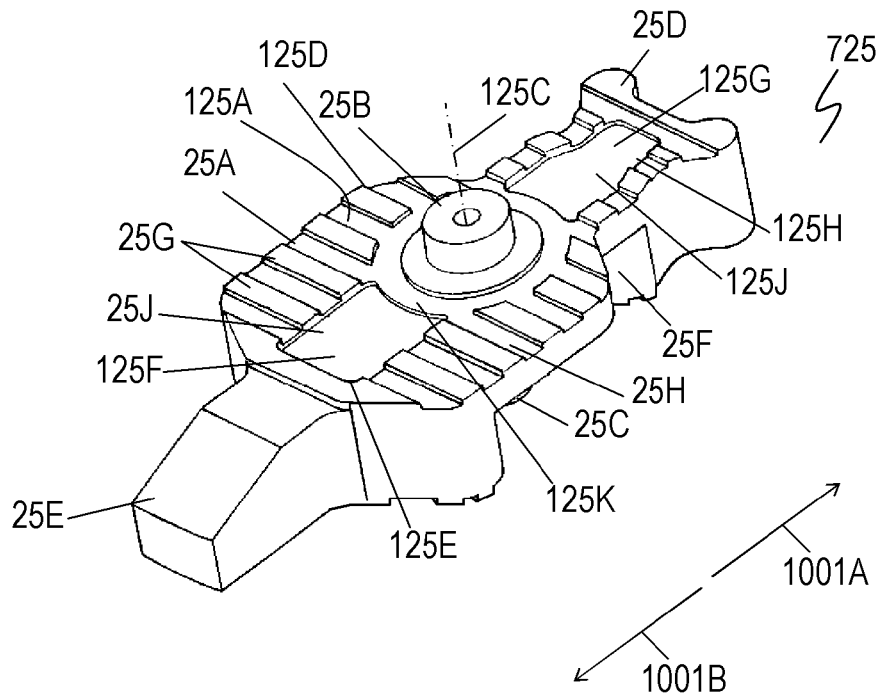
FIGS. 8A and 8B are a top perspective view and a bottom perspective view of another cam body of the turning direction indicator device according to the embodiment, respectively.
Figure 8B:
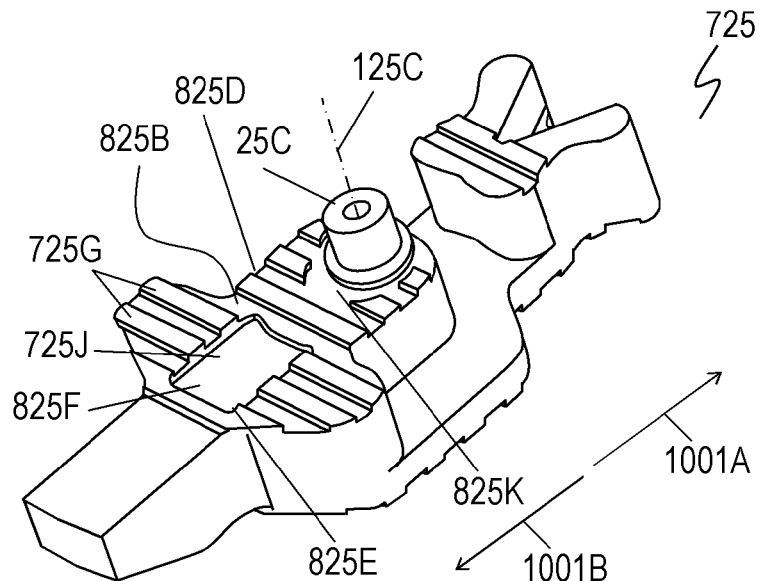

FIGS. 8A and 8B are a top perspective view and a bottom perspective view of another cam body 725 of turning direction indicator device 1001 according to the present embodiment, respectively. In FIGS. 8A and 8B, components identical to those of cam body 25 shown in FIGS. 4A and 4B are denoted by the same reference numerals. In cam body 25 shown in FIGS. 4A and 4B, ridges 25G and grease-retaining recesses 25J and 125J are provided only at upper surface 125A, while lower surface 125B that slides on upper surface 101A of actuator 1 is flat. Cam body 725 shown in FIGS. 8A and 8B has ridges 725G provided on lower surface 825B of cam body 725, grease-retaining recess 725J and flat part 825K that are similar to ridges 25G, grease-retaining recess 25J, and flat part 125K provided at upper surface 125A. Lower surface 825B has flat part 825K that surrounds the entire circumference of lower shaft part 25C. Ridges 725G are not provided in flat part 825K, that is, flat part 825K is flat. Grease-retaining recess 725J has bottom 825F and outer edge 825E which are similar to bottom 125F and outer edge 125E of grease-retaining recess 25J shown in FIG. 4A, respectively. The entirety of outer edge 825E of grease-retaining recess 725J is located inward away from outer edge 825D of lower surface 825B of cam body 725 and positioned inside lower surface 825B. Grease 1003B is provided between lower surface 825B of cam body 725 and upper surface 101A of actuator 1 (see FIG. 2). Similarly to cam body 25 shown in FIGS. 4A and 4B, cam body 725 shown in FIGS. 8A and 8B can retain grease 1003B at ridges 725G, grease-retaining recess 725J, and flat part 825K. This structure reduces the hitting noise that is produced when front cam part 25D of cam body 725 hits release projecting parts 7A and 7B. The ridges, the grease-retaining recess and the flat part may be provided only at lower surface 825B of cam body 25, and not at upper surface 125A. In this manner also, the similar effect can be achieved.

Figure 8C:
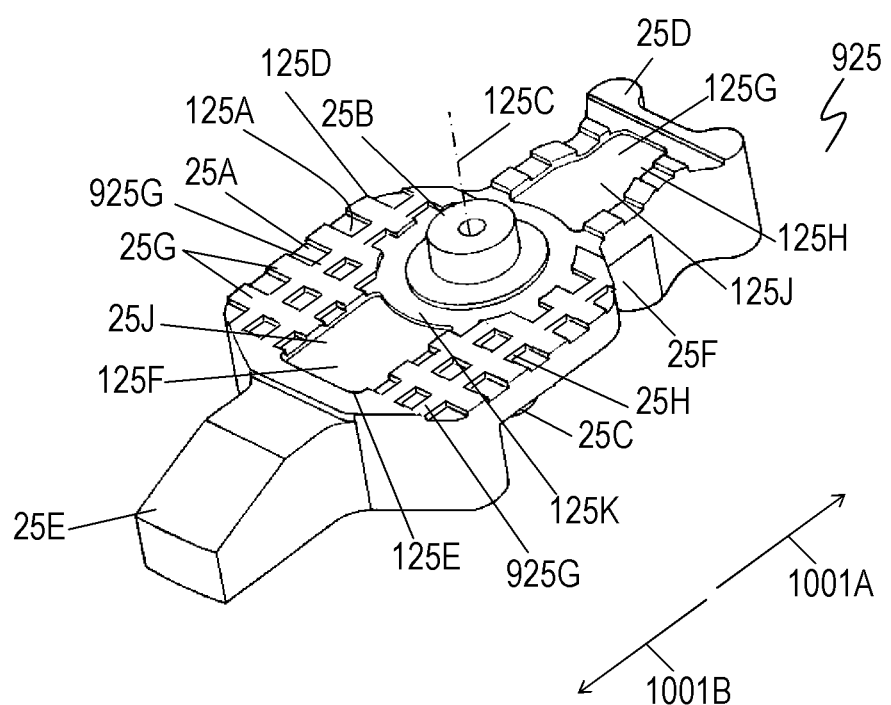
FIG. 8C is a top perspective view of still another cam body of the turning direction indicator device according to the embodiment.

FIG. 8C is a top perspective view of still another cam body 925 of turning direction indicator device 1001 of the present embodiment. In FIG. 8C, components identical to those of cam body 25 shown in FIG. 4A are denoted by the same reference numerals. Cam body 925 shown in FIG. 8C further includes ridges 925G on upper surface 125A in addition to ridges 25G. Ridges 925G extend in direction 1001A (1001B) to cross ridges 25G. That is, ridges 25G and ridges 925G extending perpendicularly to each other cross each other to form substantially a grid shape, and project from upper surface 125A of cam body 925. This structure allows grease 1003A (see FIG. 2) to be retained by ridges 25G and 925G when cam body 925 shifts and rotates, and to be less prone to be expelled from the sliding range, while production of the resistance against grease 1003A is facilitated. Ridges 925G may be provided on lower surface 825B of cam body 725 shown in FIG. 8B.

Turning direction indicator device 1001 reduces the hitting noise that is produces when cam body 25 (725, 925) hits release projecting parts 7A and 7B of release element 7 with a simple structure, and operates quietly and reliably. Therefore, it is useful for automobiles.

According to the embodiment, terms, such as "upper surface", "lower surface", "upward", "front part", "rear part", "frontward direction", and "rearward direction", indicating directions indicate relative directions that are dependent solely on relative positional relationship of components, such as actuator 1 and cam body 25, of turning direction indicator device 1001, and do not indicate absolute directions, such as a vertical direction.

What is claimed is:

1. A turning direction indicator device used with a cancel cam rotating in accordance with a rotation of a steering shaft, the turning direction indicator device comprising:
   an operating lever;
   an actuator that rotates by an operation of the operating lever so as to be positioned at a neutral position and a first operational position;
   a switch contact part that performs electrical connection and disconnection in accordance with a rotation of the actuator;
   a cover that has a lower surface having a guide groove provided therein, the guide groove extending in a rearward direction toward the cancel cam;
   a cam body that has an upper surface sliding on the lower surface of the cover;
   an urging spring that urges the cam body in the rearward direction;
   a release element that includes a coupling part, a first release projecting part projecting from the coupling part in the rearward direction, and a second release projecting part projecting from the coupling part in the rearward direction, the release element rotating together with the actuator; and
   a first grease that is provided between the upper surface of the cam body and the lower surface of the cover, wherein:
   the cam body includes:
   a base part;
   a front cam part that projects from the base part in a frontward direction opposite to the rearward direction;
   a rear cam part that projects from the base part in the rearward direction;
   an upper shaft part that projects from the upper surface of the cam body; and
   a plurality of first ridges that project from the upper surface of the cam body,
   the front cam part of the cam body is located between the first release projecting part and the second release projecting part of the release element,
   while the upper shaft part of the cam body engages with the guide groove of the cover, the cam body is slidable in the frontward direction and the rearward direction on the lower surface of the cover, and is rotatable about the upper shaft part,
   the cam body is configured to:
   when the actuator is at the neutral position, shift to a non-abutting position where the rear cam part of the cam body cannot abut the cancel cam; and when the actuator is at the first operational position, shift to an abuttable position where the rear cam part of the cam body can abut the cancel cam, a rotation of the cancel cam causing the cam body to rotate the actuator via the release element to return the actuator to the neutral position, the plurality of first ridges extend in parallel to each other in a predetermined direction, the upper surface of the cam body has a first grease-retaining recess provided therein, the first grease-retaining recess retaining the first grease, and the first grease-retaining recess is located between the plurality of first ridges in the predetermined direction.

2. The turning direction indicator device according to claim 1, wherein the predetermined direction is perpendicular to the rearward direction.

3. The turning direction indicator device according to claim 1, wherein:

the cam body further has a lower surface that slides in the rearward direction and the frontward direction on an upper surface of the actuator, the turning direction indicator device further comprising a second grease that is provided between the lower surface of the cam body and the upper surface of the actuator, and the cam body further includes a plurality of second ridges that project from the lower surface of the cam body.

4. The turning direction indicator device according to claim 3, wherein the plurality of second ridges extend perpendicularly to the rearward direction.

5. The turning direction indicator device according to claim 1, wherein the lower surface of the cam body has a second grease-retaining recess provided therein, the second grease-retaining recess retaining the second grease.

6. The turning direction indicator device according to claim 1, wherein:

the actuator rotates by the operation of the operating lever so as to be positioned at the neutral position, the first operational position, and a second position, and the cam body is configured to, when the actuator is at the second operational position, shift to the abuttable position, the rotation of the cancel cam causing the cam body to rotate the actuator via the release element to return the actuator to the neutral position.

7. A turning direction indicator device used with a cancel cam rotating in accordance with a rotation of steering shaft, the turning direction indicator device comprising:

an operating lever;

an actuator that has an upper surface and that rotates by an operation of the operating lever so as to be positioned at a neutral position and a first operational position;

a switch contact part that performs electrical connection and disconnection in accordance with a rotation of the actuator;

a cover that has a lower surface having a guide groove provided therein, the guide groove extending in a rearward direction toward the cancel cam;

a cam body that has an upper surface and a lower surface, the upper surface of the cam body shifting with respect to the lower surface of the cover, the lower surface of the cam body sliding on the upper surface of the actuator;

an urging spring that urges the cam body in the rearward direction;

a release element that includes a coupling part, a first release projecting part projecting from the coupling part in the rearward direction, and a second release projecting part projecting from the coupling part in the rearward direction, the release element rotating together with the actuator; and a grease that is provided between the lower surface of the cam body and the upper surface of the actuator, wherein:

the cam body includes:

a base part;

a front cam part that projects from the base part in a frontward direction opposite to the rearward direction;

a rear cam part that projects from the base part in the rearward direction;

an upper shaft part that projects from the upper surface of the cam body; and a plurality of ridges that project from the lower surface of the cam body, the front cam part of the cam body is located between the first release projecting part and the second release projecting part of the release element, while the upper shaft part of the cam body engages with the guide groove of the cover, the cam body is slidable on the upper surface of the actuator in the frontward direction and the rearward direction, and is rotatable about the upper shaft part, the cam body is configured to:

when the actuator is at the neutral position, shift to a non-abutting position where the rear cam part of the cam body cannot abut on the cancel cam; and when the actuator is at the first operational position, shift to an abuttable position where the rear cam part of the cam body can abut on the cancel cam, a rotation of the cancel cam causing the cam body to rotate the actuator via the release element to return the actuator to the neutral position, the plurality of ridges extend in parallel to each other in a predetermined direction, the lower surface of the cam body has a grease-retaining recess provided therein, the grease-retaining recess retaining the grease, and the grease-retaining recess is located between the plurality of ridges in the predetermined direction.

8. The turning direction indicator device according to claim 7, wherein the predetermined direction is perpendicular to the rearward direction.

9. The turning direction indicator device according to claim 7, wherein:

the actuator rotates by the operation of the operating lever so as to be positioned at the neutral position, the first operational position, and a second position, and the cam body is configured to, when the actuator is at the second operational position, shift to the abuttable position, the rotation of the cancel cam causing the cam body to rotate the actuator via the release element to return the actuator to the neutral position.

10. The turning direction indicator device according to claim 1, wherein the first grease-retaining recess has a bottom deeper than the upper surface of the cam body.

11. The turning direction indicator device according to claim 10, wherein:

the plurality of first ridges includes a plurality of third ridges that project from the upper surface of the cam body and a plurality of fourth ridges that project from the upper surface of the cam body, and the first grease-retaining recess is located between each of the plurality of third ridges and respective one of the plurality of fourth ridges in the predetermined direction.

12. The turning direction indicator device according to claim 1, wherein:
the plurality of first ridges includes a plurality of third ridges that project from the upper surface of the cam body and a plurality of fourth ridges that project from the upper surface of the cam body, and
the first grease-retaining recess is located between each of the plurality of third ridges and respective one of the plurality of fourth ridges in the predetermined direction.

13. The turning direction indicator device according to claim 7, wherein the grease-retaining recess has a bottom deeper than the lower surface of the cam body.

14. The turning direction indicator device according to claim 13, wherein:
the plurality of ridges includes a plurality of first ridges that project from the lower surface of the cam body and a plurality of second ridges that project from the lower surface of the cam body, and
the grease-retaining recess is located between each of the plurality of first ridges and respective one of the plurality of second ridges in the predetermined direction.

15. The turning direction indicator device according to claim 7, wherein:
the plurality of ridges includes a plurality of first ridges that project from the lower surface of the cam body and a plurality of second ridges that project from the lower surface of the cam body, and
the grease-retaining recess is located between each of the plurality of first ridges and respective one of the plurality of second ridges in the predetermined direction.

\* \* \* \* \*